United States Patent [19]

Herbin et al.

[11] 4,280,003

[45] Jul. 21, 1981

[54] PROCESS FOR THE PREPARATION OF HIGH DENSITY ANION EXCHANGE RESINS BY BROMINATION OF CROSSLINKED VINYLTOLUENE COPOLYMERS

[75] Inventors: Jean E. E. Herbin; Paul D. A. Grammont, both of Chauny, France

[73] Assignee: Diamond Shamrock Corporation, Dallas, Tex.

[21] Appl. No.: 48,794

[22] Filed: Jun. 15, 1979

[30] Foreign Application Priority Data

Jun. 27, 1978 [FR] France .................. 78 19146

[51] Int. Cl.³ .............. C08F 8/22; B01D 15/04; C22B 3/08; B01J 1/08
[52] U.S. Cl. .................................. 521/31
[58] Field of Search .................... 521/30, 31

[56] References Cited

U.S. PATENT DOCUMENTS

| | | | |
|---|---|---|---|
| 2,632,000 | 3/1953 | McMaster et al. | 521/31 |
| 2,632,001 | 3/1953 | McMaster et al. | 521/31 |
| 2,788,331 | 4/1957 | Greer | 521/32 |

FOREIGN PATENT DOCUMENTS 1034051  6/1966  United Kingdom .............. 521/31

OTHER PUBLICATIONS 765,165 Application 2 or A Patent–South Africa, Aug. 22, 1977–B. R. Green.

*Primary Examiner*—Joseph L. Schofer
*Assistant Examiner*—Peter F. Kulkosky
*Attorney, Agent, or Firm*—William A. Skinner

[57] ABSTRACT

The preparation of anion exchange resins having high density and capacity by bromination of particles of crosslinked vinylaromatic copolymers is described. The process is characterized in that particles of crosslinked vinyltoluene copolymers which have been swollen in a solvent are dibrominated using bromine or a bromine-releasing agent, and the brominated particles are then aminated. The product resins can be used for the extraction of metals, particularly uranium, from solutions such as ore leaching liquor.

4 Claims, No Drawings

PROCESS FOR THE PREPARATION OF HIGH DENSITY ANION EXCHANGE RESINS BY BROMINATION OF CROSSLINKED VINYLTOLUENE COPOLYMERS

FIELD OF THE INVENTION

The present invention relates generally to a process for the preparation of particles of anion exchange resins having high density and capacity and intended for the extraction of various metals from ores treated by a liquid process. More particularly the process involves the preparation of dense resins by bromination of vinyltoluene copolymers, followed by amination.

BACKGROUND OF THE INVENTION

It has been proposed in French Pat. No. 2,362,886 to prepare anionic resins with high density by bromination, chloromethylation and amination of particles of crosslinked styrene copolymers. This patent suggests a dibromination of the crosslinked styrene copolymer, which lead to a decrease in reactivity of the copolymer and tends to prevent the attachment of activatable groups by chloromethylation.

The present invention aims to provide a simpler process for preparing high density anionic resins by bromination. It has been discovered that it is possible to eliminate the expensive and dangerous step of chloromethylation if crosslinked vinyltoluene is used as the copolymer, and if this copolymer is dibrominated to permit not only the attachment of a bromine atom on the ring but also on the lateral chain. Thus there is obtained both a higher density resin and the presence of bromomethyl groups able to attach nitrogenous active groups by amination, without conducting an intermediate haloalkylation.

SUMMARY OF THE INVENTION

The process of the present invention is for the preparation of anion exchange resins having high density and capacity, by bromination of particles of crosslinked vinyltoluene copolymers. The process is characterized by the dibromination of particles of crosslinked vinyltoluene copolymer which has been previously swollen in a solvent, with bromine or a bromine-releasing agent. The dibrominated particles are then aminated.

DETAILED DESCRIPTION OF THE INVENTION

In the practice of the invention, the vinyltoluene copolymers used are prepared by suspension polymerization of vinyltoluene with at least a di- or poly-vinylaryl compound such as divinylbenzene. The copolymers can be obtained using commercial vinylbenzene, which also contains ethyl divinylbenzene. The usual proportion of divinylbenzene included in the copolymer is preferably between about 0.5 percent and about 8 percent. The copolymerization is carried out according to conventional techniques of polymerization in aqueous suspension in the presence of a catalyst such as benzoyl peroxide. The product copolymers are in the form of particles having a size in the range of about 0.3-1.3 mm, and a density in the range of about 1.05-1.15.

Chlorinated hydrocarbon solvents such as methylene chloride or dichloroethane can be used for swelling the vinyltoluene copolymers. These solvents are good swelling agents for the particles and are also good carriers of bromine.

The bromination agent may be bromine or a bromine-releasing agent. Examples of such agents include metal bromides, particularly alkali bromides which release bromine in the presence of an oxidizing agent such as sulfuric acid.

The dibromination reaction is advantageously carried out by the addition of bromine or bromine-releasing agent in the quantity of two equivalents per aromatic ring of crosslinked vinyltoluene copolymer. Further, the reaction is advantageously in the presence of a catalyst such as iron or ferrous sulfate. The reaction is generally carried out at about 20°-60° C.

The amination reaction is carried out according to conventional techniques.

The following specific examples illustrate the process of the invention.

EXAMPLE 1

Beads of vinyltoluene crosslinked with 2% of divinylbenzene (average particle size 0.55 mm) are brominated in such a way to attach two bromine atoms per copolymer unit. Into a three-necked flask equipped with a stirrer, condenser, and thermometer are introduced 59 g of copolymer beads, 250 ml of methylene chloride and 1.7 g of ferrous sulfate as a catalyst. The mixture is heated to 25°-30° C. with stirring and 51 ml of bromine are introduced over 2 hours. The reaction is then allowed to develop for 2 hours at 30°-35° C.

The dibrominated beads are then drained, washed with methanol and water, and dried in an oven at 60° C. The beads are then aminated by treating them in a mixture of 120 ml of methylal and 50 ml of water with an aqueous solution of trimethylamine (250 g/l) at 40° C.

After draining and washing, an anionic resin having 1.34 g/ml density and 0.94 eq/l capacity is obtained.

EXAMPLE 2

Into a three-necked flask equipped with a stirrer, condenser and thermometer are introduced 59 g of the copolymer used in Example 1. Then 250 ml of methylene chloride, 1.1 g of iron powder, 238 g of potassium bromide, and 400 ml of sulfuric acid (95%) are added with stirring. The temperature of the mixture is increased to 30° C. with stirring. The reaction is allowed to develop for 6-8 hours. The dibrominated beads are treated with water, drained, washed with methanol and water, then drained and dried in an oven at 60° C. They are aminated according to Example 1, and an anionic resin having a 1.35 g/ml density and a 0.96 eq/l capacity is obtained.

To show the properties of the ion exchange resins prepared according to the process of this invention in comparison with resins used previously in the extraction of metals from leaching liquors in a fluidized bed, a test method simulating industrial conditions is used. A measured sample of resin is placed in a small column called a fluidization column. A uranyl sulfate solution (200 mg/l, pH 1.8) is flowed upwardly through the resin bed. The flowrate of this solution is adjusted to obtain the same rate of expansion of the resin bed successively tested in the fluidization column (the column height is chosen to avoid displacement of resin particles from the system). Thus it is clear that the denser the resin, the higher the flowrate can be set. The solution flows continuously between the fluidization column and the measurement cell of a U.V. spectrophotometer through plastic tubing, and its uranium concentration is determined continuously by U.V. analysis. This concentration is kept steady in the system by the addition of a 20 g/l uranium solution proportional to the quantity adsorbed by the resin.

Thus the time required to reach a certain uranium ion concentration on the resin can be determined, thereby giving the velocity of the exchange kinetics of the resin and its equilibrium capacity. This analytical data permits the choice of a suitable resin for industrial extraction processes.

The following table shows the results of this test using the resins from Example 1 (density 1.34 g/ml) and Example 2 (density 1.35 g/ml) compared to a reference anionic resin of the quaternary ammonium type (density 1.10 g/ml; 1.12 g/ml in the sulfate form).

TABLE 1

| Resin | Equilibrium Capacity g/l U | Time (min.) to absorb g U/l resin | | | | |
|---|---|---|---|---|---|---|
| | | 10 g/l | 20 g/l | 30 g/l | 40 g/l | 50 g/l |
| Reference | 45 | 11.5 | 39.5 | 88 | 175 | 377 |
| Example 1 | 58 | 9.4 | 30 | 70 | 140 | 309 |
| Example 2 | 57 | 9.9 | 31 | 70 | 146 | 313 |

These results show that the brominated resins of the invention have higher capacity and exchange kinetics rate in comparison to conventional resins. They are therefore well adapted to the extraction of metals (particularly uranium) in a fluidized bed from ore leaching solutions. The results compare favorably with those obtained under similar conditions with resins described in French Pat. No. 77/26,067. The resins obtained according to this patent have densities of 1.20–1.26 g/ml and capacities of 43–51 g $U_3O_8$/l.

The present invention also provides several advantages in the process of resin preparation, including a reduction in production costs resulting from the elimination of a step (chloromethylation); a reduction in manufacturing time; and elimination of the handling of toxic chloromethyl methyl ether.

What is claimed is:

1. A process for the preparation of anion exchange resins having high capacity and a density greater than about 1.34 grams per milliliter by bromination of particles of crosslinked vinylaromatic copolymers, characterized in that vinyltoluene crosslinked with about 0.5 to about 8 percent divinylbenzene is swollen in a chlorinated hydrocarbon solvent, then is dibrominated by the addition of bromine or a bromine-releasing agent in the amount of two bromine equivalents per aromatic ring of copolymer in the presence of a catalyst to attach one bromine atom on the aromatic ring and one bromine atom on the associated lateral chain, and then is aminated.

2. A process according to claim 1 wherein the catalyst is iron or ferrous sulfate.

3. A process for the recovery of metal from ore-leaching liquor, which process consists essentially of contacting the liquor in a fluidized bed with an anion exchange resin prepared according to the process of claim 1.

4. A process according to claim 3 wherein the metal is uranium.

* * * * *